(12) United States Patent  (10) Patent No.: US 7,877,397 B2
Nagarajan et al. (45) Date of Patent: Jan. 25, 2011

(54) EXTENSIBLE COMMAND EXECUTION FOR ENTITY DATA MODEL PLATFORM

(75) Inventors: Ramesh Nagarajan, Seattle, WA (US); Subramanian Muralidhar, Bellevue, WA (US); Stephen Frederick Starck, Bothell, WA (US); Sean B. House, Seattle, WA (US); Simon Cavanagh, Redmond, WA (US); Fabio Meireles Fernandez Valbuena, Bellevue, WA (US); Katica Iceva, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 11/830,281

(22) Filed: Jul. 30, 2007

(65) Prior Publication Data

US 2009/0037394 A1 Feb. 5, 2009

(51) Int. Cl.
    *G06F 7/00* (2006.01)
(52) U.S. Cl. ...................... 707/756; 707/809
(58) Field of Classification Search ................ 707/100, 707/103 R, 103 Y, 103 X, 103 Z, 756, 809, 707/808, 810, 802, 803
    See application file for complete search history.

(56) References Cited

U.S. PATENT DOCUMENTS

| 5,765,159 | A | 6/1998 | Srinivasan |
| 5,850,544 | A | 12/1998 | Parvathaneny et al. |
| 6,374,252 | B1 | 4/2002 | Althoff et al. |
| 6,457,020 | B1 | 9/2002 | Carey et al. |
| 6,574,639 | B2 | 6/2003 | Carey et al. |
| 6,578,046 | B2 | 6/2003 | Chang et al. |
| 6,748,374 | B1 | 6/2004 | Madan et al. |
| 6,996,558 | B2 | 2/2006 | Dettinger et al. |
| 7,080,361 | B2 | 7/2006 | Aigen et al. |
| 2002/0091702 | A1 | 7/2002 | Mullins |
| 2004/0230584 | A1* | 11/2004 | Nouri .......................... 707/100 |
| 2006/0155780 | A1* | 7/2006 | Sakairi et al. ............... 707/201 |
| 2006/0195477 | A1 | 8/2006 | Deem et al. |
| 2006/0265356 | A1* | 11/2006 | Kiernan et al. ................. 707/2 |
| 2009/0006447 | A1* | 1/2009 | Balmin et al. ............... 707/102 |

OTHER PUBLICATIONS

Daniel A Keim, Hans-Peter Kriegel, Andreas Miethsam, Query Translation of an Object-Oriented into a Relational Query Language; Ludwig-Maximilians-Universitat Munchen; Dec. 1993, p. 1-25.*

(Continued)

*Primary Examiner*—Hosain T Alam
*Assistant Examiner*—Amy Ng
(74) *Attorney, Agent, or Firm*—Turocy & Watson, LLP

(57) ABSTRACT

Systems and methods that translate queries defined by an entity model, to a dialect recognizable by storage provider (e.g., relational store). A bridge component facilitates translation of a rich object structure into flat relational constructs, which can then be executed by a relational store. Accordingly, queries defined by applications in terms of entity concepts can readily be employed in conjunction with relational data stores. Similarly, results obtained from executing the query can be converted back to a form understandable by the application.

16 Claims, 10 Drawing Sheets

OTHER PUBLICATIONS

Zhen Hua Liu, Muralidhar Krishnaprasad, Vikas Arora, Native Xquery processing in Oracle XMLDB, ACM, 2005, p. 828-833.*

Ho-Chuan Huang, Jon Kerridge, Shang-Liang Chen, A Query Mediation Approach to Interoperability of Hetergeneous Databases, IEEE, 2000, p. 1-8.*

Gustuv Fahl, et al. Query processing over object views of relational data. http://delivery.acm.org/10.1145/770000/765562/70060261.pdf?key1=765562&key2=9393014611&coll=ACM&dl=ACM&CFID=75919783&CFTOKEN=92791909, Apr. 1995.

Shekar Ramanathan, et al. Extraction of object-oriented structures from existing relational databases. http://delivery.acm.org/10.1145/250000/248615/P059.pdf?key1=248615&key2=003401461&coll=ACM&dl=ACM&CFID=75919783&CFTOKEN=92791909, last accesed on Nov. 21, 2006.

Andrey Balmin, et al. Storing and querying XML data using denormalized relational databases. Dec. 21, 2001. http://delivery.acm.org/10.1145/1060000/1053476/778_2003_Article_113.pdf=key1=1053476&key2=4416014611&coll=ACM&dl=ACM&CFID=75919783&CFTOKEN=92791909.

* cited by examiner

US 7,877,397 B2

EXTENSIBLE COMMAND EXECUTION FOR ENTITY DATA MODEL PLATFORM

BACKGROUND

Advent of a global communications network such as the Internet has facilitated exchange of enormous amounts of information. Additionally, costs associated with storage and maintenance of such information has declined, resulting in massive data storage structures. As such, data has become an important asset in almost every application, whether it is a Line-of-Business (LOB) application utilized for browsing products and generating orders, or a Personal Information Management (PIM) application used for scheduling a meeting between people. Applications perform both data access/manipulation and data management operations on the application data. Typical application operations query a collection of data, fetch the result set, execute some application logic that changes the state of the data, and finally, persist the data to the storage medium.

Traditionally, client/server applications relegated the query and persistence actions to database management systems (DBMS), deployed in the data tier. If there is data-centric logic, it is coded as stored procedures in the database system. The database system operated on data in terms of tables and rows, and the application, in the application tier, operated on the data in terms of programming language objects (e.g., Classes and Structs). The mismatch in data manipulation services (and mechanisms) in the application and the data tiers was tolerable in the client/server systems. However, with the advent of the web technology (and Service Oriented Architectures) and with wider acceptance of application servers, applications are becoming multi-tier, and more importantly, data is now present in every tier.

In such tiered application architectures, data is manipulated in multiple tiers. In addition, with hardware advances in addressability and large memories, more data is becoming memory resident. Applications are also dealing with different types of data such as objects, files, and XML (eXtensible Markup Language) data, for example.

In hardware and software environments, the need for rich data access and manipulation services well-integrated with the programming environments is increasing. One conventional implementation introduced to address problems described above is a data platform. The data platform provides a collection of services (mechanisms) for applications to access, manipulate, and manage data that is well integrated with the application programming environment. In general, such conventional architecture fail to adequately supply: complex object modeling, rich relationships, the separation of logical and physical data abstractions, query rich data model concepts, active notifications, better integration with middle-tier infrastructure, and the like.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enables execution of rich queries—which contain structure/object oriented concepts such as inheritance, nesting, and the like—against relational stores that do not typically support such structure, via employing a bridge component associated with an Entity Data Model (EDM). Such bridge component facilitates translation of a rich object structure into flat relational constructs, which can then be executed by a relational store. The bridge component can include a transformation component that receives a canonical representation of a query (e.g., a command tree). Moreover a plan compilation component as part of the bridge component can then transform such canonical representation (which includes structure types, nesting and the like), and outputs a flattened command tree (without structure types/nesting) to be sent to a server. As such, queries defined by applications in terms of entity concepts can readily be employed in conjunction with relational data stores. Similarly, results obtained from executing the query can be converted back to a form understandable by the application. Accordingly, a form that queries are written therein can be abstracted, wherein data can be modeled in same manner as employed in associated applications (e.g., queries need not be written in a manner that data is stored in the database, but rather the abstraction in form of entities.)

In a related methodology, initially an application defines a query in terms of entity concept. The query is then represented by an abstract class in form of a tree structure with nodes, which has metadata tied therewith. Such tree structure functions as a canonical tree representation of the query, which enables translation into Structured Query Language (SQL) and/or facilitates direct comprehension by an associated database (e.g., typically without translation into a textual format). The canonical representation is then translated into native (e.g., SQL) dialect that is recognizable by the storage provider. Such translated query is then executed in form of data readers that are subsequently assembled and consumed by the application.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
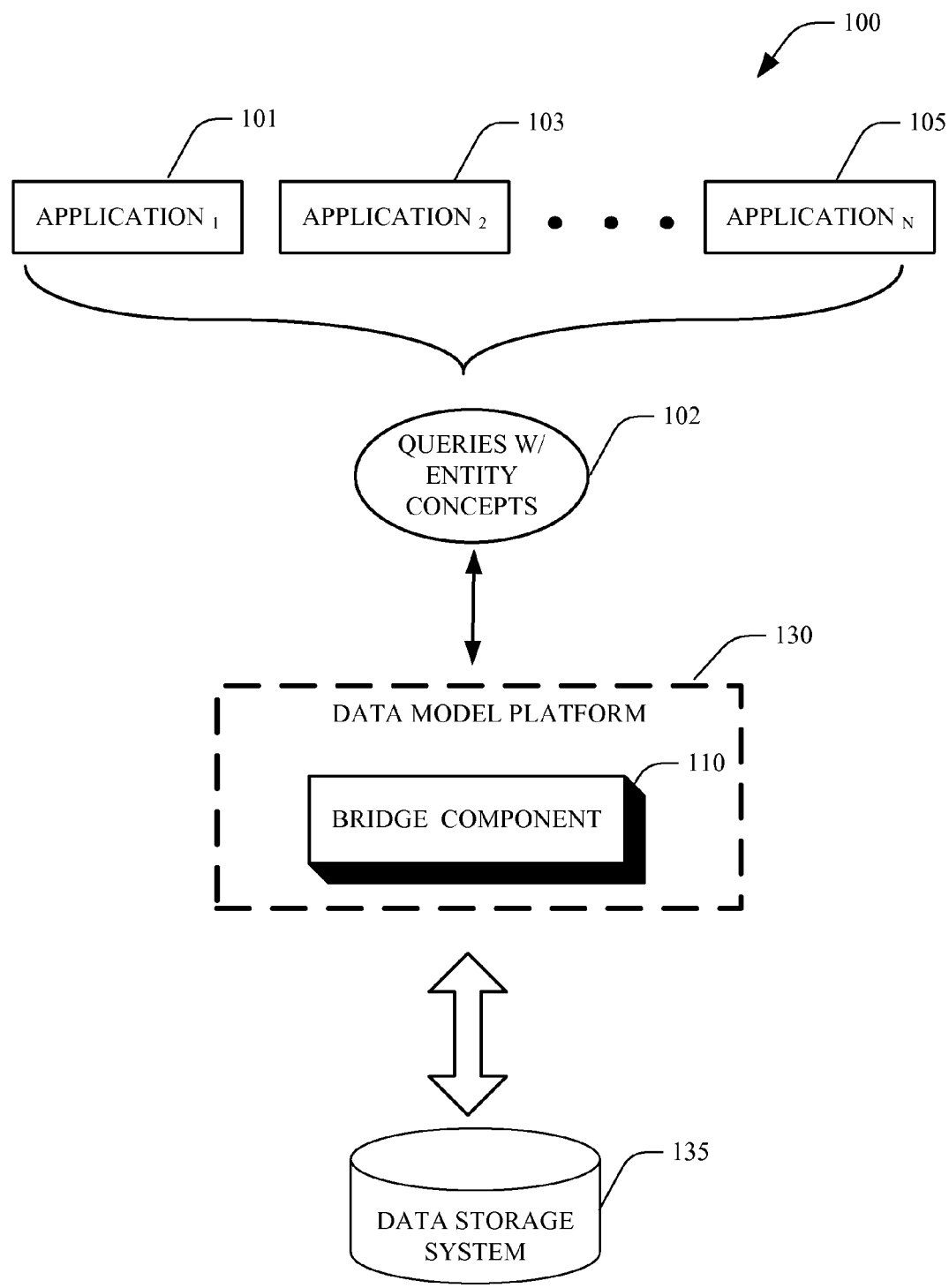
FIG. 1 illustrates a block diagram of a Bridge component that enables execution of queries with entity concepts in accordance with an aspect of the subject innovation.

FIG. 1 illustrates a block diagram of a system 100 that enables execution of queries 102 that employ entity concepts 102, to be executed against relational stores that do not typically support such structure, via employing a bridge component associated with an Entity Data Model (EDM). Typically, the EDM is an extended relational data model that supports basic relational concepts, rich types with inheritance, and relationships. Users need the ability to issue rich queries against their data expressed in terms of the EDM. As illustrated in FIG. 1, the query 102 can be associated with a data model platform 130 such as a base class library that is employed to access data in a relational database system (e.g. an ADO.net framework). An exemplary data model 130 and related data support mechanisms can be implemented into a set of technologies such as the Active X Data Objects for managed code (ADO.NET) platform. Such ADO.net platform can be designed to provide consistent access to data sources such as MICROSOFT® Structured Query Language (SQL) Server, as well as data sources that can be exposed through Object Linking and Embedding for Databases (OLE DB) and Extensible Markup Language (XML). Data-sharing consumer applications can also employ ADO.NET to connect to these data sources and retrieve, manipulate, and update data. The bridge component 110 facilitates translation of a rich object structure into flat relational constructs, which can then be executed by a relational store associated with the data storage system 135 (e.g., translation into Structured Query Language (SQL) and/or other dialect of the data storage system 135).

Such data storage system 135 can be a complex model based at least upon a database structure, wherein an item, a sub-item, a property, and a relationship are defined to allow representation of information within a data storage system as instances of complex types. For example, the data storage system 135 can employ a set of basic building blocks for creating and managing rich, persisted objects and links between objects. An item can be defined as the smallest unit of consistency within the data storage system 135, which can be independently secured, serialized, synchronized, copied, backup/restored, and the like. Such item can include an instance of a type, wherein all items in the data storage system 135 can be stored in a single global extent of items. The data storage system 135 can be based upon at least one item and/or a container structure. Moreover, the data storage system 135 can be a storage platform exposing rich metadata that is buried in files as items. The data storage system 135 can include a database, to support the above discussed functionality, wherein any suitable characteristics and/or attributes can be implemented. Furthermore, the data storage system 135 can employ a container hierarchical structure, wherein a container is an item that can contain at least one other item. The containment concept is implemented via a container ID property inside the associated class. A store can also be a container such that the store can be a physical organizational and manageability unit. In addition, the store represents a root container for a tree of containers with in the hierarchical structure. As such, queries defined by applications in terms of entity concepts can readily be employed in conjunction with relational data stores. Similarly, results obtained from executing the query can be converted back to a form understandable by the application. Accordingly, a form that queries can be written is abstracted, wherein data can be modeled in same manner as employed in associated applications 101, 103, 105 (1 to N, where N is an integer)—so that queries need not be written in a manner that data is stored in the database, but rather queries are presented in form of the abstraction.

Figure 2:
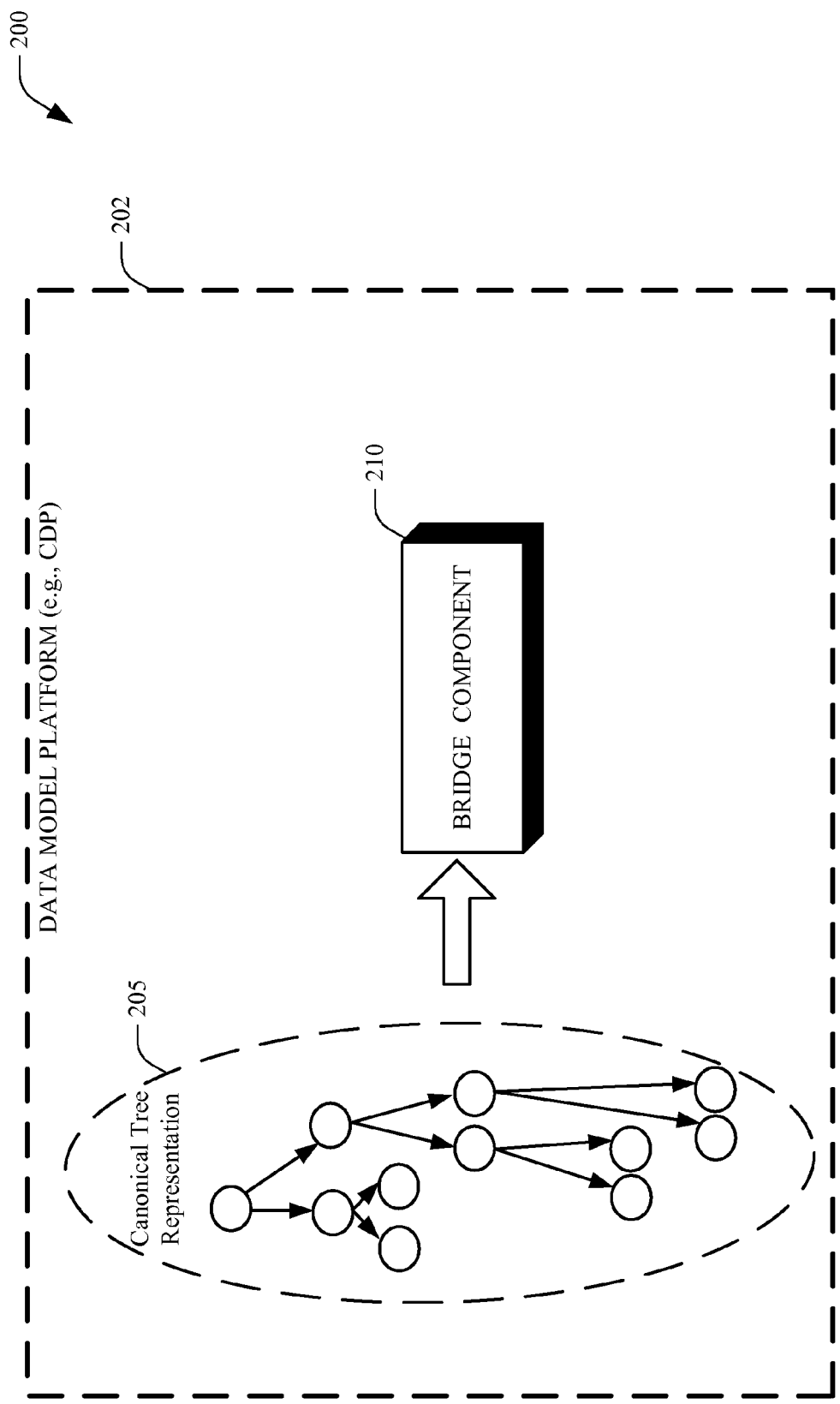
FIG. 2 illustrates a data model platform that implements the bridge component of the subject innovation.

FIG. 2 illustrates a system 200 that can employ the Bridge component 210 of the subject innovation. The data model platform 202 can function as a platform that provides a collection of services/mechanisms for applications to access, manipulate, and manage data that is integrated with the application programming environment. In general, a data model platform is a platform that provides a collection of services/mechanisms for applications to access, manipulate, and manage data that is well integrated with the application programming environment. For example, the data model platform 202 can be a common data platform (CDP) that provides data services which are common across a variety of application frameworks (e.g., PIM—Personal Information Manager) framework, and LOB (Line-of-Business) framework). For example, the range of applications include end-user applications such as Explorer, Mail, and Media applications; Knowledge Worker applications such as Document Management and Collaboration applications; LOB applications such as ERP (Enterprise Resource Planning) and CRM (Customer Relationship Management); Web Applications and System Management applications. In such system 200, a query can be represented by an abstract class in form of a tree structure with nodes, which has metadata tied therewith. The tree structure functions as a canonical tree representation of the query, which enables translation into Structured Query Language (SQL) and/or facilitates direct comprehension by an associated database (e.g., typically without translation into a textual format).

Accordingly, the CDP 202 provides data services that are common across the application frameworks and end-user applications associated therewith. The CDP 202 further includes an API (not shown) that facilitates interfacing with the applications and application frameworks, and a runtime component (not shown), for example. The API provides the programming interface for applications using CDP in the form of public classes, interfaces, and static helper functions. Typically, the CDP runtime component is a layer that implements the various features exposed in the public API layer. It implements the common data model by providing object-relational mapping and query mapping, enforcing data model constraints, etc. More specifically, the CDP runtime can include: the common data model component implementation; a query processor component; a sessions and transactions component; an object cache, which can include a session cache and an explicit cache; a services component that includes change tracking, conflict detection; a cursors and rules component; a business logic hosting component; and a persistence and query engine, which provides the core persistence and query services. Internal to persistence and query services are the object-relational mappings, including query/update mappings.

Moreover, the store management layer (not shown) provides support for core data management capabilities (e.g., scalability, capacity, availability and security), wherein the CDP 202 supports a rich data model, mapping, querying, and data access mechanisms for the application frameworks 204. The CDP mechanisms are extensible so that multiple application frameworks 204 can be built on the data platform. The application frameworks 204 are additional models and mechanisms specific to application domains (e.g., end-user applications and LOB applications). Such layered architectural approach supplies several advantages, e.g., allowing each layer to innovate and deploy independently and rapidly.

The canonical representation 205 is consumed by the bridge component 210 to facilitate translation of extended relational data model that supports basic relational concepts, rich types with inheritance, and relationships, into native (e.g. SQL) dialect that is recognizable by the storage provider. Such translated query is then executed in form of datareaders (e.g., objects used to sequentially read data from a data source), which are subsequently assembled and consumed by the application.

Figure 3:
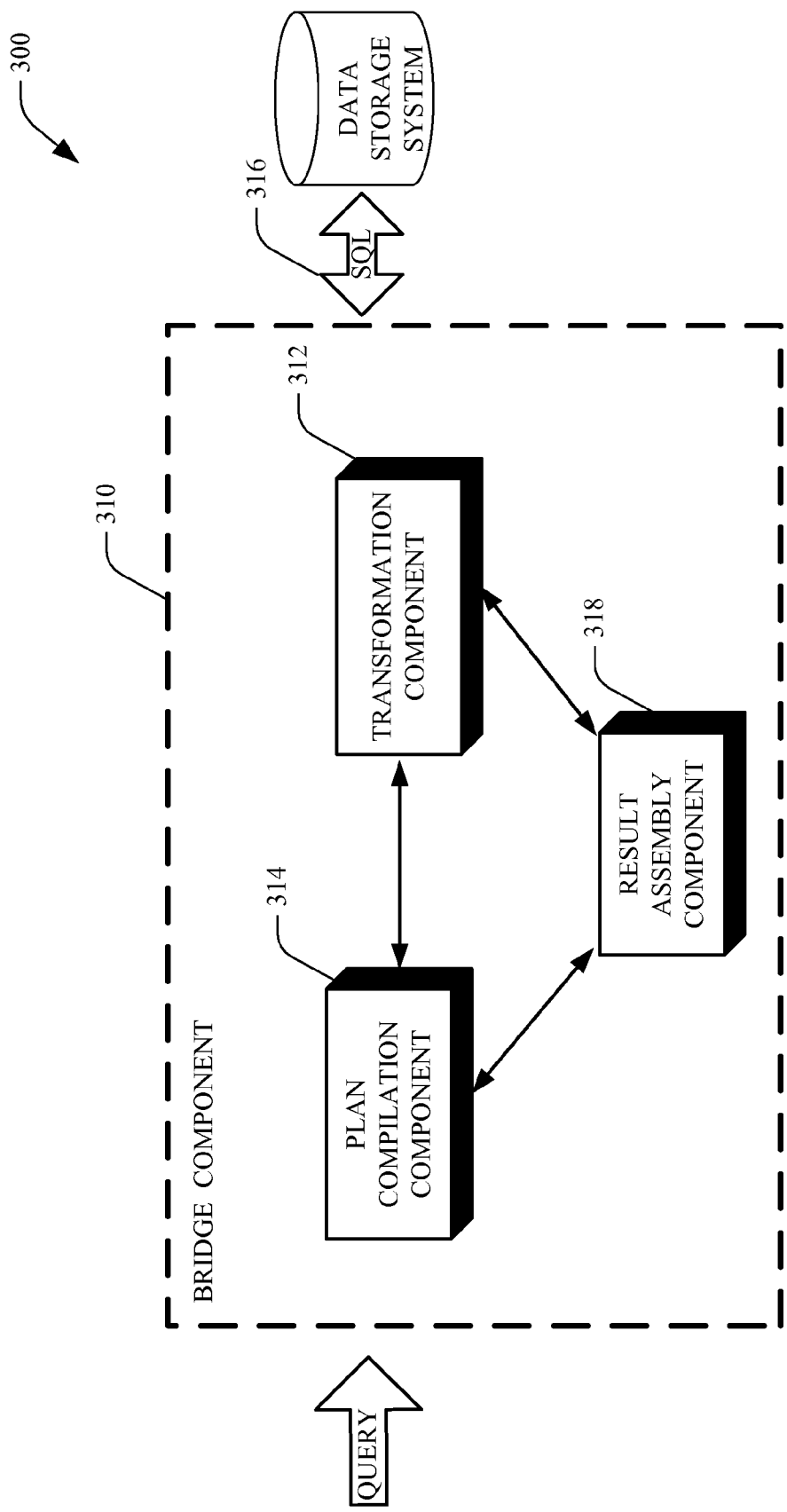
FIG. 3 illustrates a block diagram for a particular bridge component in accordance with an aspect of the subject innovation.

FIG. 3 illustrates a particular bridge component 310 in accordance with a further aspect of the subject innovation. As illustrated, the bridge component 310 can include a transformation component 312 and a plan compilation component 314. The transformation component 312 receives a canonical representation of a query (e.g., a command tree). Such command tree includes nodes that can represent various relational and Entity constructs and operations such as expressions (e.g., representing a computation including constants, variables, functions, constructors and standard relational operators like filter, join, and the like wherein every expression can have a data type that represents the type of the result produced by that expression.) Likewise, the plan compilation component 314 can then transform such canonical representation (which includes structure types, nesting and the like), and outputs a flattened command tree (without structure types/nesting) to be sent to a server. For example, a function of the compilation component is to employ a Rule-based approach to generically transform a high-level CQT into lower-level CQTs that can be executed by a relational provider. As such, the plan compilation component 314 can remove EDM specific constructs like type constructors, nesting, from the user query, converts the user query into one or more flat relational queries, along with reassembly information, and maintain such information as part of the Bridge component 310. Similarly, the Results Assembly component 318 can construct rich structures in terms of the EDM from the flat relational results returned by the underlying store provider.

As such, queries defined by applications in terms of entity concepts can readily be employed in conjunction with relational data stores. Similarly, results obtained from executing the query can be converted back to a form understandable by the application. Accordingly, a writing form of the queries can be abstracted, wherein data can be modeled in same manner as employed in associated applications (e.g., queries need not be written in a manner that data is stored in the database, but rather the abstraction.)

Figure 4:
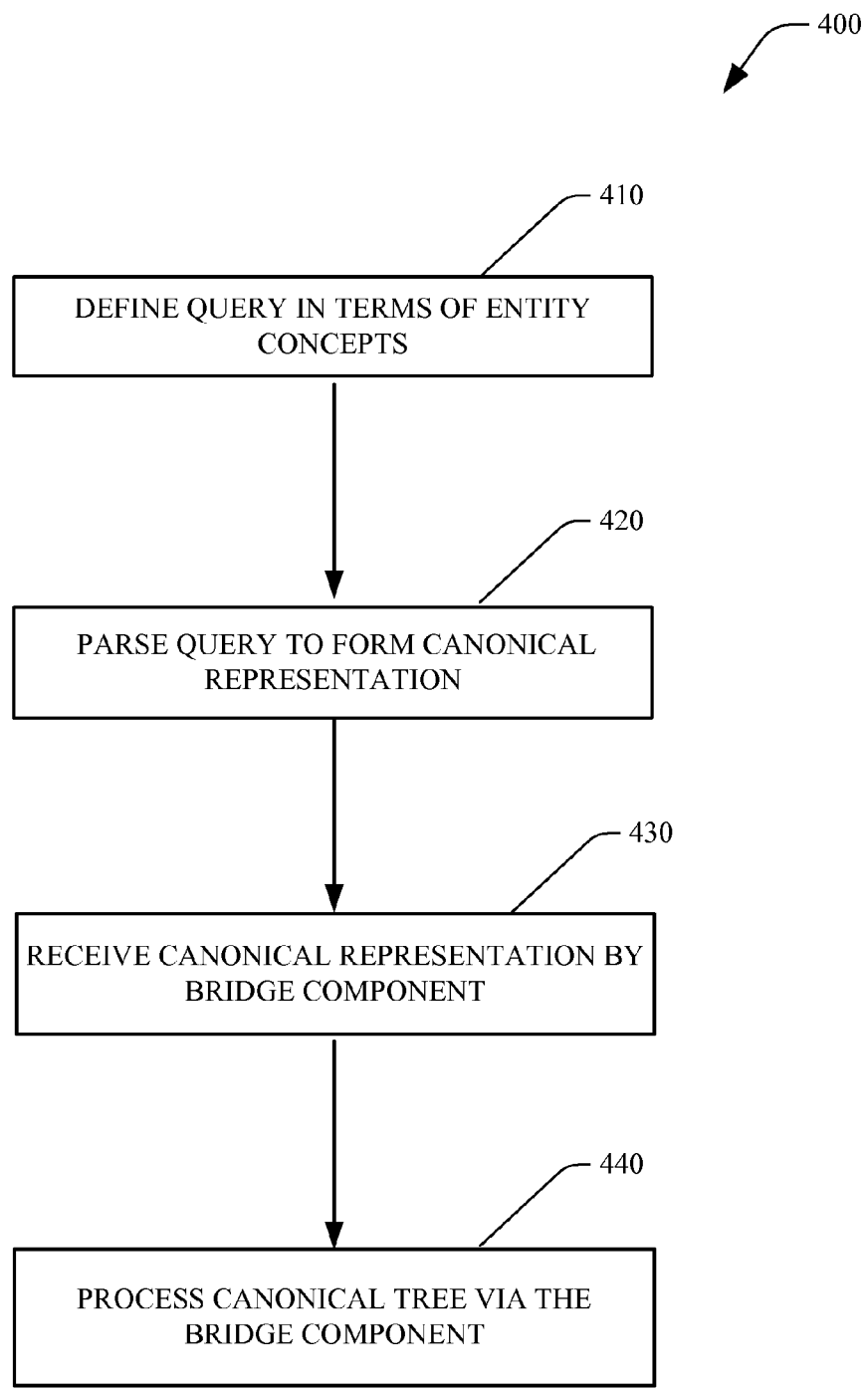
FIG. 4 illustrates a methodology of processing a query in accordance with an aspect of the subject innovation.

FIG. 4 illustrates a methodology 400 of inputting a query representation into a bridge component in accordance with an exemplary aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 410 a query is defined in terms of entity concepts. Such entity concepts can implement structure/object oriented concepts such as inheritance, nesting, and the like. Subsequently and at 420, the query can be parsed to facilitate creation of nodes for a tree structure, which functions as a canonical tree representation of the query. As such, a plurality of nodes can be obtained that form the canonical representation, which represent a structured form of the query. Moreover, the nodes can represent various relational and Entity constructs and operations such as expressions. Next and at 430, the generated command tree can be fed into the bridge component for a processing thereof at 440.

Figure 5:
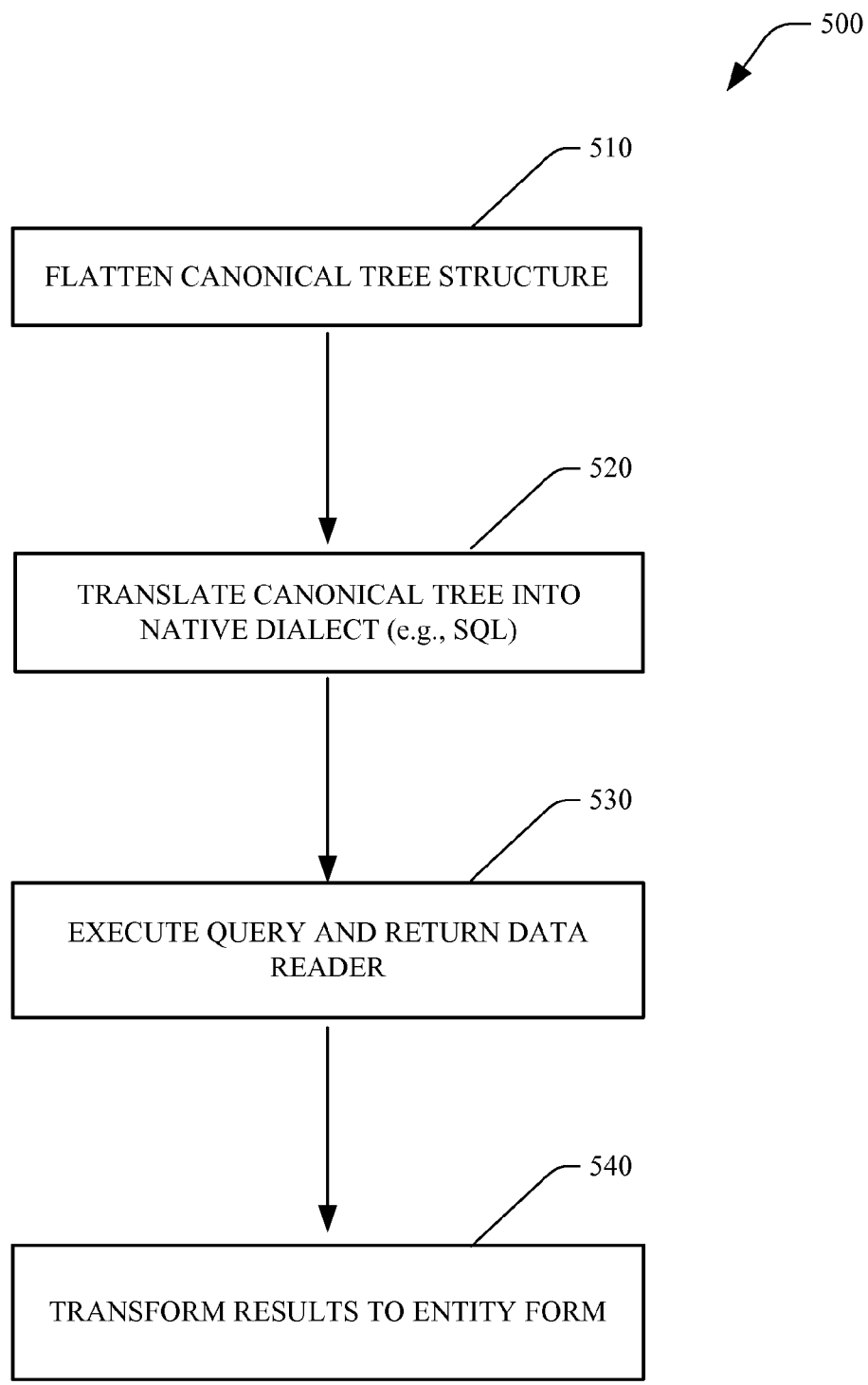
FIG. 5 illustrates a further methodology of transforming results of a query to entity forms.

FIG. 5 illustrates a related methodology 500 in accordance with a further aspect of the subject innovation. Initially and at 510, the bridge component receives the command tree (which includes structure types, nesting and the like), and outputs a flattened command tree (without structure types/nesting). Moreover, column maps or assembly of instructions can be outputted, as how to re-assemble the results from the command tree to a nested instruction type command tree that was initially inputted thereto. Next, and at 520 the flattened canonical representation is then translated into native (e.g., SQL) dialect that is recognizable by the storage provider. Such translated query is then executed at 530 in form of data readers that are subsequently assembled and transformed into entity forms that can be consumed by the application at 540 (e.g., the flat results can be reconstituted into structured results that manifest nesting and other complex structure.)

Figure 6:
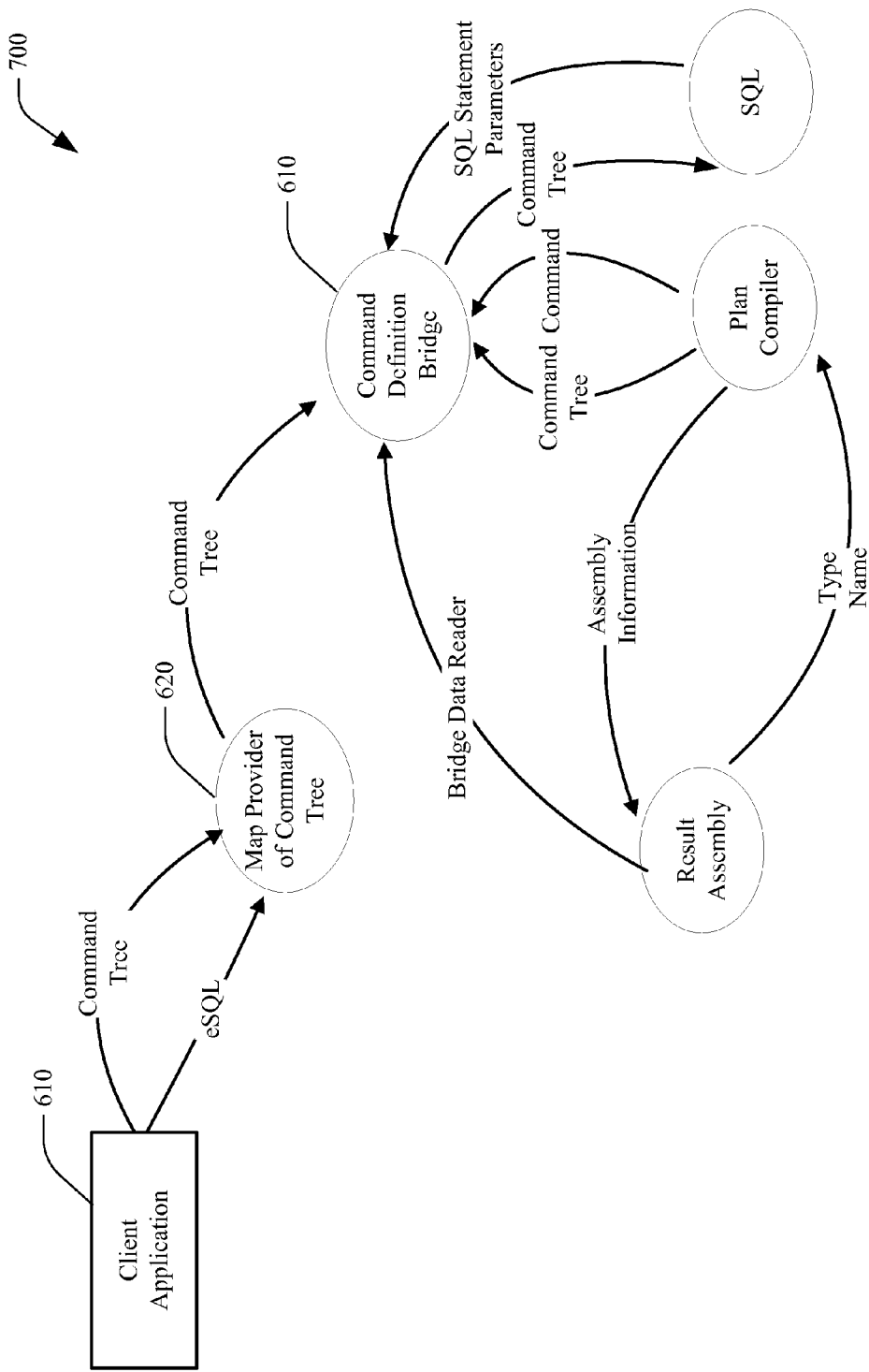
FIG. 6 illustrates an exemplary query flow through a CDP that is associated with a Bridge component in accordance with an aspect of the subject innovation.

FIG. 6 illustrates an exemplary query flow through a CDP that is associated with a Bridge component in accordance with an aspect of the subject innovation. Initially a client application 610 can issue a query against map provider 620 as an eSQL query. Thereafter, mapping translations can be performed on the canonical tree. The Bridge component calls the Plan Compiler to factor the canonical tree, and perform a (data-model) compensation. The canonical tree can then be translated into a native dialect (e.g., SQL) that can be recognizable by the storage provider. Such native dialect can then be executed by the storage provider and the results obtained in form of a data reader, for example. The results can then be assembled (e.g., from multiple data readers returned by the Storage providers) to create a single DataReader in terms of the EDM space. The resulting data reader can then be forwarded to the application for a consumption thereof.

Figure 7:
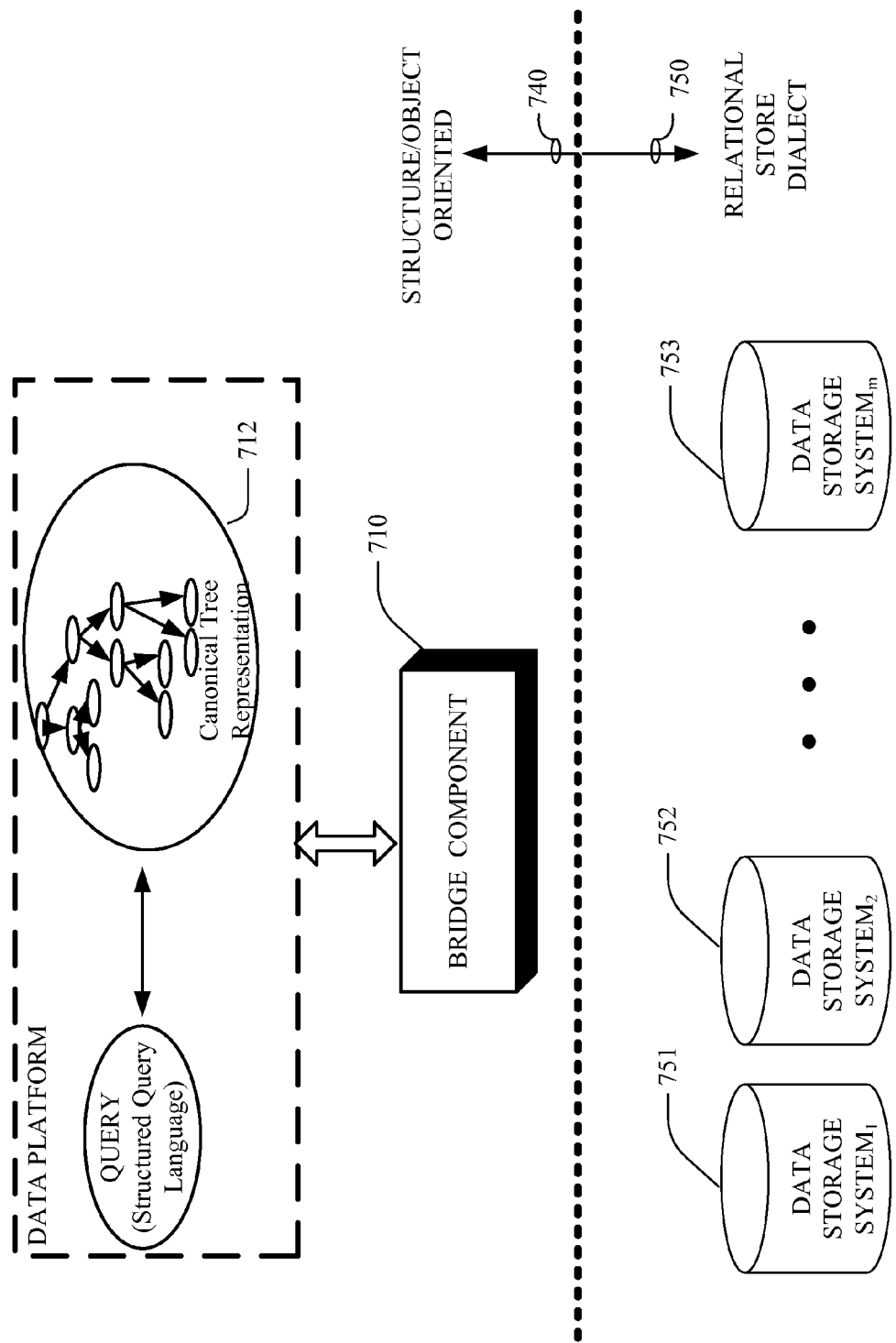
FIG. 7 illustrates a bridge component that facilitates a transformation between a rich object structure and a relational store dialect.

FIG. 7 illustrates a bridge component 710 that facilitates a transformation between a rich object structure 740 (e.g., on the client side) and a relational store dialect (the data storage provider 751, 752, 753, 1 thru m where m is an integer) associated with the relational store dialect. As explained earlier, the bridge component 710 can supply a mapping, wherein the mapping transformation encapsulates object relational mapping functionality to perform a query translation on the canonical tree of the subject innovation. Hence, a standard manner of query representation is provided to generate an SQL for the .NET framework, for example. Similarly, results obtained from executing the query can be converted back to a form understandable by the application. Accordingly, a form that queries are written therein can be abstracted, wherein data can be modeled in same manner as employed in associated applications (e.g., queries need not be written in a manner that data is stored in the database, but rather the abstraction.)

The following description relates to an exemplary Bridge component and internal interfaces/data structures associated therewith.

Bridge Data Reader

The BridgeDataReader object is a data reader that processes the plan instructions to surface the desired data reader.

```
internal class BridgeDataReader : DbDataReader {
    internal Plan      Plan;      // access to the original plan;
}
```

BridgeDataRecord

The BridgeDataReader object is a data reader that processes the plan instructions to surface a structured type that represents the desired data record.

```
internal class BridgeDataRecord : DbDataRecord {
    internal Plan      Plan;      // access to the original plan;
}
```

ColumnMap

The ColumnMap object identifies where to get the value for a specific column in the result. It points at the command and ordinal that should return the result.

```
internal class ColumnMap[B1][sfs2] {
    internal ColumnMapType   ColumnMapType;    // How to expose the column value.
    internal NestedTypeInfo  NestedTypeInfo;   // For ColumnType.Structured, ColumnType.Set:
                                               // describes the nested type, and should be
                                               // null for the rest.
    internal int             CommandOrdinal;   // For ColumnType.Simple: the ordinal of
                                               // the command to get the column value from.
    internal int             ColumnOrdinal;    // For ColumnType.Simple: the ordinal of
                                               // the column on the command to get column
                                               // value from.
}
```

ColumnMapType

The ColumnMapType enumeration identifies how a ColumnMap should be handled, that is, how to expose the column in the reader/record.

```
internal enum ColumnMapType {
    Simple,              // column delegates to a reader
    Structured,          // column is a structured type, that is, a nested record.
    Set,                 // column is a set, that is a nested reader.
    TypeDiscriminating,  // column is used to determine the type of the record/reader,
                         // it should not be surfaced publicly.
}
```

NestedTypeInfo

The NestedTypeInfo object identifies how a ColumnMap should be handled, that is, how to expose the column in the reader/record.

```
internal class NestedTypeInfo {
    internal Type             MetaData;             // Describes the base type of the record or
                                                    // reader to be surfaced. Type
                                                    // columns can be utilized to
                                                    // support poly-
                                                    // morphic types.
    internal ColumnMap        TypeDescriminator[sfs5]; // the type descriminator column for
                                                    // polymorphic types
    internal List<ColumnMap>  ColumnMap;            // One entry per column in the Reader or
                                                    // Record to be surfaced.
}
```

ParameterMap
The ParameterMap object identifies where to get or set the value for a specific parameter in the command tree.

```
internal class ParameterMap {
        internal int    CommandTreeOrdinal;   // ordinal of physical command tree
                                              // where parameter value is needed.
        internal string ParameterName;        // may not be needed if names are
                                              // identical between logical and
                                              // physical command trees.
}
```

Plan
The Plan object represents the results of the transformation process.

```
internal class Plan {
        internal CommandTree[ ] CommandTreeCollection;
        internal Dictionary<string, ParameterMap[ ]> ParameterMapCollection;
                                              // parameter name->places that need it...
        internal ColumnMap[ ] ColumnMapCollection;   // top-level reader column map.
        static internal PlanCache Cache = PlanCache.Instance;
                                              // access to the plan cache
        internal PlanExecutionContext CreateExecutionContext( );
}
```

PlanExecutor
The PlanExecutor object is how a plan is executed.

```
internal class PlanExecutor {
        internal            Plan Plan;           // access to the original plan;
        internal DbCommand[ ] PhysicalCommands;  // array of commands to execute;
                                                 // set/get parameter values here.
        internal DbDataReader   Execute(int commandTimeout, CommandBehavior behavior,
                            DbTransaction transaction);
                                                 // execute everything and return
                                                 // the resulting reader --
                                                 // ExecuteNonQuery & ExecuteScalar
                                                 // are syntactic sugar?
}
```

BridgeCommand

```
public class BridgeCommand : DbCommand {
    protected internal BridgeCommand(DbProviderFactory providerFactory) {
        // stores the provider factory for later use
        // construct the InnerCommand object here - there is no point
        // in doing this lazily, since each property setter/getter will
        // require it.
    }
    private DbCommand InnerCommand;           // What better way to store stuff than an
                                              // inner command object?
    override public string          CommandText { get; set; }
                                              // delegates to InnerCommand.CommandText
    override public CommandTree     CommandTree { get; set; }
                                              // delegates to InnerCommand.CommandTree
    override public int             CommandTimeout { get; set; }
                                              // delegates to InnerCommand.CommandTimeout
```

-continued

```
override public CommandType              CommandType { get; set; }
                                                // delegates to InnerCommand.CommandType
override protected DbConnection          DbConnection { get; set; }
                                                // delegates to InnerCommand.Connection
override protected DbParameterCollection DbParameterCollection { get; }
                                                // delegates to InnerCommand.Parameters
override protected DbTransaction         DbTransaction { get; set; }
                                                // delegates to InnerCommand.Transaction
override public bool                     DesignTimeVisible { get; set; }
                                                // delegates to InnerCommand.DesignTimeVisible
override public UpdateRowSource          UpdatedRowSource { get; set; }
                                                // delegates to InnerCommand.UpdatedRowSource
override public void Cancel( ) {
    // Ouch. Needs to call Cancel on each underlying command in a thread-safe way...
}
override protected DbParameter CreateDbParameter( ) {
    // delegates to InnerCommand.CreateParameter( )
}
override protected DbDataReader ExecuteDbDataReader(CommandBehavior behavior) {
    // mainline logic!
}
override public int ExecuteNonQuery( ) {
    // Should be simple syntactic sugar...
    DbDataReader rdr = ExecuteDbDataReader( );
    return rdr.RecordsAffected;
}
override public object ExecuteScalar( ) {
    // Should be simple syntactic sugar...
    DbDataReader rdr = ExecuteDbDataReader(CommandBehavior.SingleRow);
    rdr.Read( );
    return rdr.GetValue(Ø);
}
override public void Prepare( ) {
    // mainline logic!
}
}
```

Figure 8:
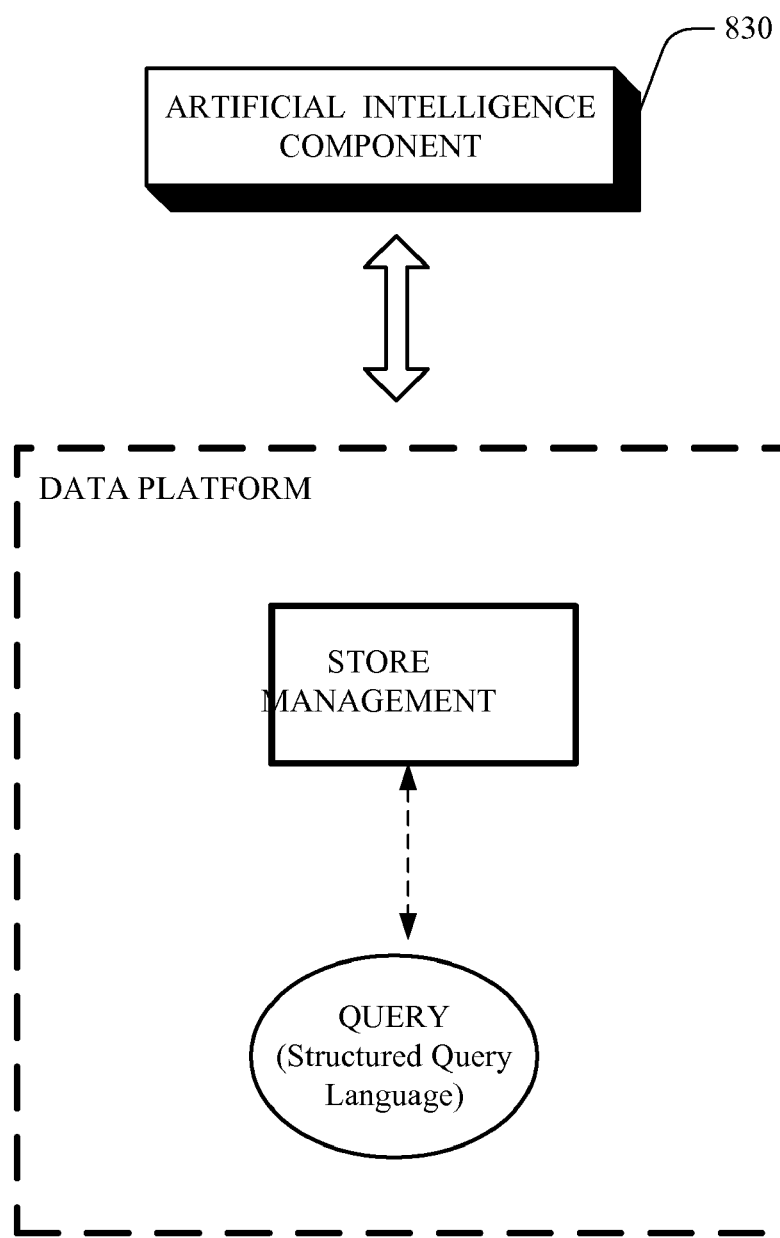
FIG. 8 illustrates an artificial intelligence (AI) component that can be employed in conjunction with the bridge component of the subject innovation.

FIG. 8 illustrates an artificial intelligence (AI) component 830 that can be employed to facilitate inferring and/or determining when, where, how to generate an abstract class in form of a tree structure in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 830 can employ any of a variety of suitable AI-based schemes as described supra in connection with facilitating various aspects of the herein described invention. For example, a process for learning explicitly or implicitly how a node associated with the canonical tree structure should be generated can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
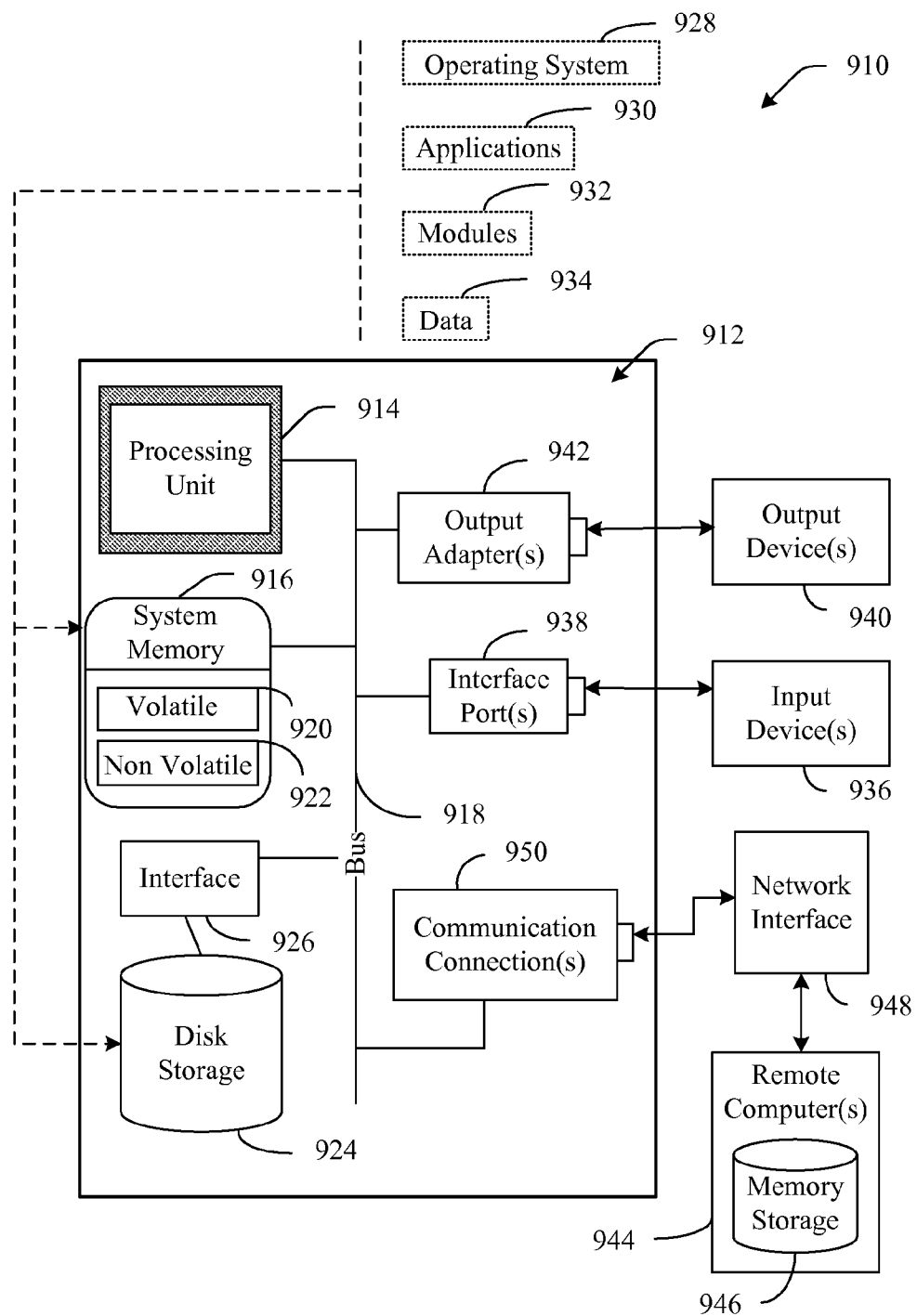
FIG. 9 illustrates an exemplary environment for implementing various aspects of the subject innovation.
Figure 10:
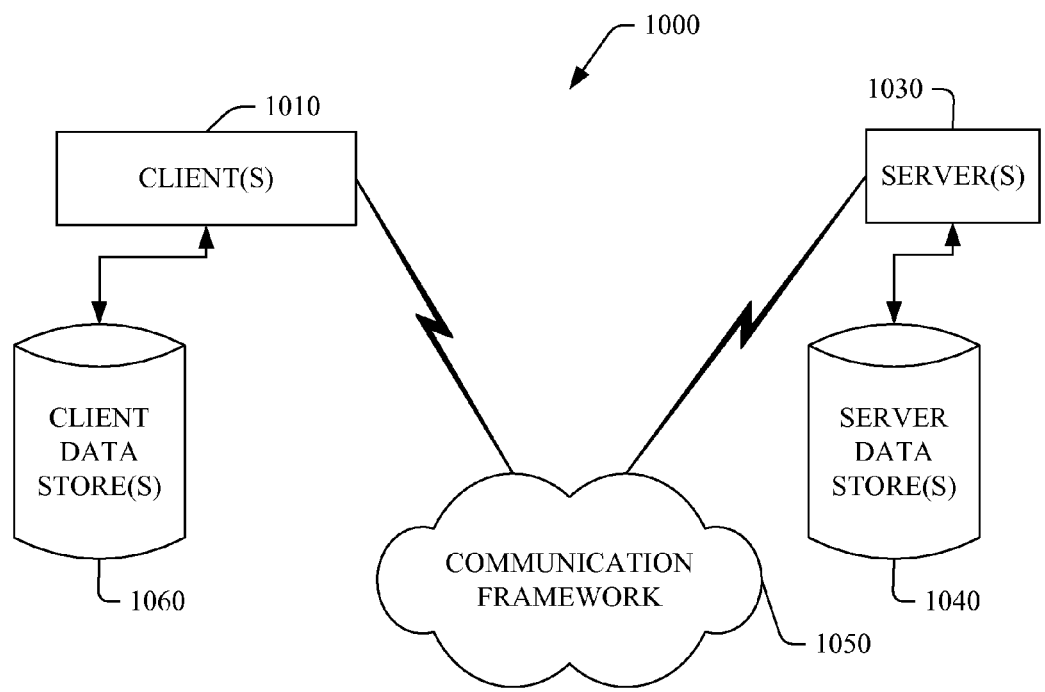
FIG. 10 is a schematic block diagram of a sample-computing environment that can be employed for a bridge component according to an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing the bridge component of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising at least one processor coupled to at least one machine-readable storage medium storing instructions executable by the at least one processor to implement:

a transformation component configured to receive a canonical representation of an object-oriented query in a form of a command tree structure with nodes representing at least one of entity constructs or expressions associated with computational operations and data types;

a plan compilation component configured to transform the canonical representation into a flattened command tree;

a data model platform configured to provide services common to a plurality of disparate application frameworks, the services including support of the object-oriented query via object-relational mappings;

a data reader object configured to return results from execution of the flattened command tree against a relational database;

a column mapper configured to assemble the results into a nested instruction-type command tree;

a query processor component;

a sessions and transactions component;

an object cache including a session cache and an explicit cache;

a services component configured to perform change tracking and conflict detection;

a cursors and rules component;

a business logic hosting component; and a persistence and query engine configured to provide core persistence and query services.

2. The computer-implemented system of claim 1, wherein the data reader is configured to return the results to a requesting application.

3. The computer-implemented system of claim 1, further comprising a result assembly component configured to construct nested structures from the results.

4. The computer-implemented system of claim 1, further comprising a data manipulation language configured to employ a non-textual form for representation of the object-oriented query.

5. The computer-implemented system of claim 1, wherein the canonical representation is translatable into a structured query language.

6. The computer-implemented system of claim 1, further comprising an artificial intelligence component configured to facilitate creation of the nodes.

7. The computer-implemented system of claim 1, wherein the application frameworks include at least one of a Personal Information Manager (PIM) framework or a Line-of-Business (LOB) framework.

8. A computer-implemented method comprising the following computer-executable acts:

parsing an object-oriented query to create a canonical representation of the object-oriented query in a form of a command tree structure with nodes representing at least one of entity constructs or expressions associated with computational operations and data types;

processing the canonical representation into a flattened command tree, the processing including performing object-relational mappings by a data model platform configured to provide services common to a plurality of disparate application frameworks;

translating the processed canonical representation into a dialect of a relational store;

returning results from execution of the dialect on the relational store;

assembling the results into a nested instruction-type command tree; and providing a plurality of support components including a query processor component, a sessions and transactions component, an object cache including a session cache and an explicit cache, a services component configured to perform change tracking and conflict detection, a cursors and rules component, a business logic hosting component, and a persistence and query engine configured to provide core persistence and query services.

9. The computer-implemented method of claim 8, further comprising creating a data reader based on the execution of the dialect on the relational store.

10. The computer-implemented method of claim 8, further comprising returning the assembled results to a requesting application.

11. The computer-implemented method of claim 8, further comprising representing the object-oriented query at least partly in a non-textual format.

12. The computer-implemented method of claim 8, further comprising executing the processed canonical representation against an SQL (structured query language) provider.

13. The computer-implemented method of claim 8, further comprising supporting a data model for an application framework that issues the object-oriented query.

14. The computer-implemented method of claim 8, further comprising outputting a column map describing how to assemble the results into the nested instruction-type command tree.

15. The computer-implemented method of claim 8, further comprising reconstituting the results into an object model.

16. A computer-readable storage medium storing instructions, the instructions to, if executed by a computing device, cause the computing device to perform operations comprising:

receiving an object-oriented query in a form of a command tree structure with nodes representing at least one of entity constructs or expressions associated with computational operations and data types;

transforming the canonical representation into a flattened command tree, the transforming including performing object-relational mappings in support of the object-oriented query by a data model platform configured to provide services common to a plurality of disparate application frameworks;

translating the flattened command tree to a dialect of a storage provider;

returning results from execution of the dialect against the storage provider;

assembling the results into a nested instruction-type command tree; and providing a plurality of support components including a query processor component, a sessions and transactions component, an object cache including a session cache and an explicit cache, a services component configured to perform change tracking and conflict detection, a cursors and rules component, a business logic hosting component, and a persistence and query engine configured to provide core persistence and query services.

* * * * *